United States Patent
Rios-Quesada et al.

(10) Patent No.: US 9,935,536 B2
(45) Date of Patent: Apr. 3, 2018

(54) COMPACT DIRECT-DRIVE ACTUATOR GENERATING A CONSTANT FORCE

(71) Applicant: MOVING MAGNET TECHNOLOGIES (MMT), Besançon (FR)

(72) Inventors: Javier Rios-Quesada, Besançon (FR); Guillaume Loussert, Besançon (FR); Michaël Delbaere, Avannes (FR)

(73) Assignee: Moving Magnet Technologies (MMT), Besancon (FR)

( * ) Notice: Subject to any disclaimer, the term of this patent is extended or adjusted under 35 U.S.C. 154(b) by 250 days.

(21) Appl. No.: 14/376,506

(22) PCT Filed: Feb. 14, 2013

(86) PCT No.: PCT/FR2013/050296
§ 371 (c)(1),
(2) Date: Aug. 4, 2014

(87) PCT Pub. No.: WO2013/121147
PCT Pub. Date: Aug. 22, 2013

(65) Prior Publication Data
US 2015/0048694 A1    Feb. 19, 2015

(30) Foreign Application Priority Data

Feb. 15, 2012  (FR) ..................... 12 51390

(51) Int. Cl.
*H02K 41/00* (2006.01)
*H02K 41/02* (2006.01)
*H02K 41/03* (2006.01)

(52) U.S. Cl.
CPC .......... *H02K 41/031* (2013.01); *H02K 41/00* (2013.01); *H02K 41/02* (2013.01); *H02K 41/03* (2013.01); *H02K 2201/18* (2013.01)

(58) Field of Classification Search
CPC ........ H02K 41/00; H02K 41/02; H02K 41/03; H02K 41/0356; H02K 2201/18; H02K 35/00; H02K 35/02; H02K 41/031
(Continued)

(56) References Cited

U.S. PATENT DOCUMENTS

4,195,277 A    3/1980 Leicht
4,924,123 A    5/1990 Hamajima et al.
(Continued)

*Primary Examiner* — Bernard Rojas
*Assistant Examiner* — Alexander Singh
(74) *Attorney, Agent, or Firm* — Harness, Dickey & Pierce, PLC (57) ABSTRACT

The present disclosure relates to an electromagnetic actuator of the type producing a force due to the current that remains substantially constant over the entirety of its useful travel Y and that has a low force in the absence of current, including at least one stator structure, at least one electrical supply coil, and a moving member, the stator structure having, on the one hand, a central pole running perpendicular to the direction of the travel Y and having a width $Y_{C1}$ in the direction of the travel and terminating at its end in a width $Y_{C2}$ that is greater than or equal to the travel Y of the moving member, $Y_{C2}$ being greater than $Y_{C1}$, and, on the other hand, two lateral poles having widths $Y_{L1}$ in the direction of the travel and terminating at their end in a width $Y_{L2}$ greater than $Y_{L1}$.

20 Claims, 5 Drawing Sheets (58) Field of Classification Search
USPC ......... 310/12.01, 12.02, 12.03, 12.04, 12.05,
310/12.06, 12.07, 12.08, 12.09, 12.11,
310/12.12, 12.13, 12.14, 12.15
See application file for complete search history.

(56) References Cited

U.S. PATENT DOCUMENTS

| | | |
|---|---|---|
| 5,136,194 A | 8/1992 | Oudet et al. |
| 5,559,378 A | 9/1996 | Oudet et al. |
| 5,701,042 A * | 12/1997 | Takei .................. H02K 41/031 310/12.01 |
| 6,249,065 B1 | 6/2001 | Oudet et al. |
| 7,898,122 B2 | 3/2011 | Andrieux et al. |
| 2003/0218391 A1* | 11/2003 | Hirata .................... H04R 9/063 310/12.16 |
| 2004/0263003 A1 | 12/2004 | Jack et al. |
| 2005/0242675 A1 | 11/2005 | Thornton et al. |
| 2006/0244337 A1* | 11/2006 | Makita .................. H02K 21/16 310/257 |
| 2008/0174185 A1* | 7/2008 | Giovanardi .......... H02K 41/031 310/12.04 |
| 2008/0220930 A1 | 9/2008 | Ramsay et al. |

\* cited by examiner

COMPACT DIRECT-DRIVE ACTUATOR GENERATING A CONSTANT FORCE

CROSS-REFERENCE TO RELATED APPLICATIONS

This application is a National Phase Entry of International Application No. PCT/FR2013/050296, filed on Feb. 14, 2013, which claims priority to French Patent Application Serial No. 1251390, filed on Feb. 15, 2012, both of which are incorporated by reference herein.

TECHNICAL FIELD

The present invention relates to the field of contactless moving magnets or electromagnetic actuators, and more particularly those producing a force that remains substantially constant over the travel even in case of intense current causing the saturation of the magnetic circuit.

BACKGROUND

Technologies relating to contactless actuators as disclosed in U.S. Pat. No. 4,195,277 are known in the state of the art. Such an actuator relates to the utilisation of a moving armature composed of a single-pole magnet. The moving assembly faces a stator structure composed of a "C"-shaped circuit containing a coil. Such structure has the advantage of a constant variation of the magnetic flux caused by the magnet through the coil, during the motion of the magnet. Such flux gradient per motion unit is called the force factor of the actuator; when multiplied by the magneto-motive force of the coil, it makes it possible to obtain the force generated by said actuator. Such force is then constant for a constant force factor and a given current. However the structure provided is not adapted to actuators which must have a high force factor because only one pole is used on the moving magnet and 2 poles are used on the stator.

3-stator pole structures can thus be found in the state of the art and more particularly in the applicant's patent WO90/16109 A1, which make it possible to enhance the force factor by using two poles on the moving magnet. If it is desired to create an actuator having a high force per electric power unit, a high magneto-motive force of the coil is required in addition to a high force factor. This requires a large dimensioned coil. Such structure thus has the drawback of very large axial overall dimensions since three poles are used on the stators, to which twice the height of the coils must be added. According to the teachings of this patent, the travel of such an actuator is then smaller than half the difference between the total height of the magnetic circuit including the coil and the total height of the magnetized parts ($2 \cdot Y_A$). Thus, for instance, for a total height of the magnetic circuit of 52 mm and a total height of the magnetized parts of 37 mm, such an actuator would have a travel of 7.5 mm only enabling it to produce a constant force over this travel.

The applicant's patent EP00607354B1 is also known, which proposes to remedy such a problem of overall dimensions by using a housing provided in the stator part, wherein the coil is embedded. The axial overall dimensions of the structure are then much more reduced since it is equivalent to the added height of the three stator poles which twice the distance between the central pole and the lateral pole is added to, with this distance being reduced, this time, to half the air gap E, which corresponds to the sum of the magnet thickness and the mechanical clearance between the magnet and the surface of the stator. According to the teachings of this patent, the central pole must have a height $Y_C$ equal to the travel increased by the distance E, with the width of the lateral poles $Y_L$ being greater than the width of the central pole. Thus, for a height of 52 mm, the teachings of this patent lead us to an actuator having a maximum travel of 14 mm, which is a real improvement with respect to patent WO90/16109 A1. The direct compensation therefor is that the result is a proximity between the central pole and the lateral poles, which favours the leakages of the magnetic flux between the stator poles. With a view to reducing the leakage flux between the poles, the specialists in the art then react by chamfering the poles, which is also disclosed in patent EP00607354B1.

Such actuators are for instance found in automotive applications wherein the constant characteristic of the force over the entire travel as well as the proportionality of force with current are appreciated, i.e. when it is desired to regulate the positioning of a valve to adjust the flow of a fluid (for instance exhaust gas recirculation valves) or to regulate the positioning of a pedal to make the latter active and able to transmit information to the driver. The problem of overall dimensions is particularly important in such small spaces since each millimeter saved is precious to enable the positioning of the actuator. However, although the last mentioned actuator has the advantage of providing dimensioning rules for a compact actuator in order to produce a constant force over the travel, in nominal rating, it has the drawback of not being adapted to the problems entailed by enlarged travel compact actuators able to produce a constant force over the entirety of its travel, and more particularly for high saturation ratings.

The application for U.S. Patent Publication No. 2008/0220930, which discloses a linear actuator comprising tubular permanent magnets positioned around an armature core for an axial motion in a tubular stator upon exciting concentric coils connected to the armature, is also known in the state of the art. The stator has parts radially extending towards the inside of the coils and one towards the other under each coil, which defines a space between the coil and the armature. The rings have a substantially radially magnetized structure and the coils are configured for the input of single-phase power. Two pairs of spaced crowns are positioned on the core, wherein the external axial length of the rings is equal to half the axial length of the rings it is provided with. This solution has the drawback of poor overall dimensions and force feature.

SUMMARY

The present invention thus aims at providing a moving magnet actuator able to provide, in a reduced space, a maximum travel whereon the force generated by the actuator will be constant, inclusive of when the electric power is maximum due to the joint action of two dimensional rules against the teachings of the prior art. More precisely, the invention relates to a three stator pole actuator, the moving armature of which is composed of two magnetic poles made of a magnetized ferromagnetic material, the overall dimensions of which, in the direction of its travel, is substantially equal to three times the length of the travel. In this type of structure, the specialists in the art would try to maximize the flux passage sections in the poles so as to delay the occurrence of saturation, which tends to cause leakages between the poles. Then again, the specialists in the art would try to remedy this drawback by chamfering the poles.

For this purpose, the invention, in its broadest sense, relates to an electromagnetic actuator of the type producing a force due to the current that remains substantially constant over the entirety of its useful travel Y consisting of at least one stator structure, at least one electrical supply coil, and a moving member, said stator structure having, on the one hand, a central pole running perpendicular to the direction of said travel Y and having a width $Y_{C1}$ in the direction of the travel and terminating at its end in a width $Y_{C2}$ that is greater than or equal to the travel Y of the moving member, with $Y_{C2}$ being greater than $Y_{C1}$, and, on the other hand, two lateral poles having widths $Y_{L1}$ in the direction of the travel and terminating at their end in a width $Y_{L2}$ greater than $Y_{L1}$, with the lateral poles and the central pole being separated by a distance $Y_G$, with the moving member 2 that is able to move relative to the stator structure comprising an armature supporting at least two adjacent thin permanent magnets each having a width $Y_A$, with the moving member 2 and the stator structure delimiting an air gap E, with the coil having a width $Y_B$, characterized in that the width $Y_{L2}$ of the lateral poles is equal to $(2Y_{L1}+2Y_B+Y_{C1}-2Y_G-Y_{C2})/2$ and less than the width $Y_{C2}$ of the central pole and in that said thin permanent magnets are adjacent. It more particularly relates to an electromagnetic actuator of the type producing a force due to the current that remains substantially constant over the entirety of its useful travel Y and that has a low force in the absence of current, consisting of at least one stator structure, at least one electrical supply coil, and a moving member, said stator structure being made of a soft ferromagnetic material and having, on the one hand, a central pole running perpendicular to the direction of said travel Y and having a width $Y_{C1}$ in the direction of the travel and terminating at its end in a width $Y_{C2}$ that is greater than or equal to the travel Y of the moving member, with $Y_{C2}$ being greater than $Y_{C1}$, and, on the other hand, two lateral poles having widths $Y_{L1}$ in the direction of the travel and terminating at their end in a width $Y_{L2}$ greater than $Y_{L1}$, with the lateral poles and the central pole being separated by a distance $Y_G$, with the moving member that is able to move relative to the stator structure comprising an armature supporting at least two adjacent thin permanent magnets each having a width $Y_A$, with the moving member and the stator structure delimiting an air gap E, with the coil having a width $Y_B$, characterized in that the width $Y_{L2}$ of the lateral poles is equal to $(2Y_{L1}+2Y_B+Y_{C1}-2Y_G-Y_{C2})/2$ and less than the width $Y_{C2}$ of the central pole. This way, when the magnetic transition of both poles of the mobile armature leaves the position facing the full sectional area of the central pole to substantially start the last quarter of the actuator travel and arrives opposite the part matching the central pole shoe, the end of the upper magnetic pole simultaneously arrives, in turn, opposite the full sectional area of the lateral pole. In a reduced space wherein it is attempted to make a 15 mm travel, for instance, with a central pole such that $Y_C$=17.2 mm, 2 lateral poles such that $Y_L$=15.4 mm and 2 magnets having a total width such that $2 \cdot Y_A$=37 mm in a 52 mm space, this results in a lower coil than the teachings of the prior art.

Preferably, the width $Y_B$ of the coils is equal to the width $Y_A$ of the magnets. Such an additional feature makes it possible to compensate the force loss of the actuator at the beginning of the travel (which is the position wherein the magnetic fluxes of the magnet and of the coil are in opposite directions) due to a loss of the magneto-motive force of the coil. As a matter of fact, because of the presence of the full section of the lateral pole $Y_{L1}$ opposite the end of the magnet, the level of the force generated by the actuator at the end of the travel (which is the position wherein the magnetic fluxes of the magnet and of the coil are additive) is higher than the one which would result from the application of the prior art.

In a preferred embodiment, the distance between the moving member and the stator structure defines a mechanical clearance j and the lateral poles have a variable thickness, considered as perpendicular to the direction of the travel Y and said thickness, defined in the thinnest part thereof, is of the order of magnitude of the mechanical clearance j. More particularly, the thickness of the lateral poles defined in the thickest part thereof, is at most equal to the thickness $L_A$ of the thin magnets, when considered as perpendicular to the direction of the travel Y. In a preferred embodiment, the thin magnets have a magnetization the direction of which is mainly perpendicular to the direction of the travel Y.

In a particular embodiment, the thin magnets have a magnetization the direction of which is perpendicular to the travel Y in the central area of the thin magnets and rotating on the ends thereof. In an alternative embodiment, the armature supports four adjacent magnets in order to increase the force constant. The travel of the actuator may be considered as linear or circular, without the teachings disclosed in the present invention being different. When the travel is linear, the stator structure and the moving member may preferably revolve around an axis co-linear with the direction of the travel Y.

Even though the description of the invention is given for an actuator revolving around an axis (axi-symmetry), an alternative embodiment may be considered wherein the stator structure and the moving member are in a direction perpendicular to the direction of the travel Y, which makes it possible to use an assembly of metal sheets, for instance, for the stator structure. Eventually, the lateral poles may, in an alternative embodiment, have different widths $Y_{L1}$.

BRIEF DESCRIPTION OF THE FIGURES

The invention will be better understood when reading the description of an exemplary non restricting embodiment, while referring to the appended drawings, wherein.

DETAILED DESCRIPTION OF THE EMBODIMENTS

Figure 1:
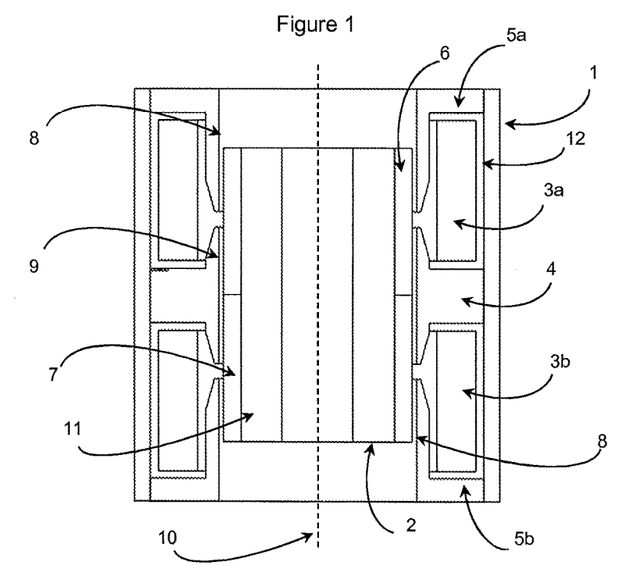
FIG. 1 shows a schematic sectional view of the actuator according to the preferred embodiment defining the main geometric parameters.
Figure 2:
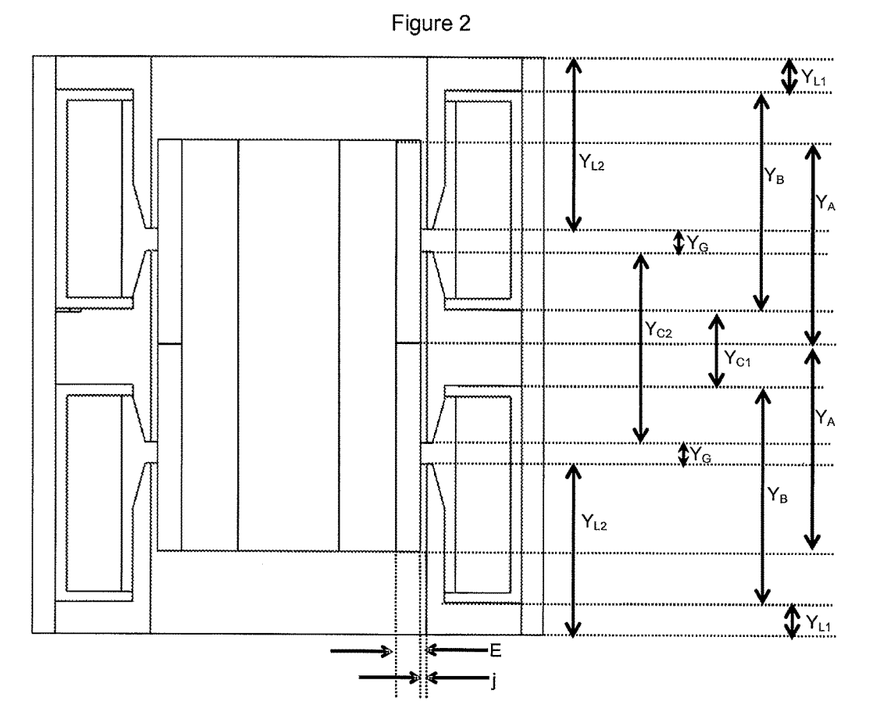
FIG. 2 shows a schematic sectional view of the actuator according to the preferred embodiment defining the main dimensions.

FIGS. 1 and 2 schematically show an actuator according to a preferred embodiment. This actuator has an axi-symmetric geometry around the axis 10 and is composed of a stator structure 1 composed of a central pole 4 having an axial width $Y_{C1}$ and two lateral poles 5a, 5b, having a width $Y_{L1}$. Two electric power coils 3a, 3b, having an axial width $Y_B$, are positioned between the central pole 4 and the lateral poles 5a, 5b. Such width $Y_B$ takes into account the body of a coil supporting said coil 3a, 3b, if any. The central pole 4 runs in a direction perpendicular to the axis 10 and is terminated by an axial extension 9 having a greater width than the basis of the central pole 4 and extending axially on either side of the central pole 4 defining an extreme width $Y_{C2}$.

The lateral poles 5a, 5b are preferably identical but may be asymmetrical so that one lateral pole can be wider than the other one. They have an axial extension 8 which runs toward the central pole 4, thus defining an extreme width $Y_{L2}$. The lateral poles 5a, 5b and the central pole 4 are made of a soft ferromagnetic material and are connected together by a yoke 12, which is also made of a soft ferromagnetic material. The lateral poles 5a, 5b are separated from the central pole 4 by a distance $Y_G$.

The actuator also has a moving member 2, composed of two adjacent magnets 6, 7 having identical widths $Y_A$. Such moving member 2 moves over a travel Y. They are preferably alternately (incoming and outgoing flux) and radially magnetized so that the magnetic flux produced is oriented towards the poles. Any other magnetization than a radial one may be considered according to the known techniques of the prior art, more particularly in order to locally increase the force level.

The magnets 6, 7 have a tubular thin shape. They are directly adjacent to each other, without any air or pole gap between the front surfaces of two consecutive magnets 6, 7. The magnetization of the thin magnets 6, 7 is perpendicular to the direction of the travel Y in the central area of the thin magnets 6, 7. It may be radial or diametral.

This magnetization direction is not necessarily constant. It may be oriented in a direction which varies near the ends of the magnetized area. End of the magnetized area means the annular segment extending on either side of the magnetized area of the moving member, over less than 5% of the total length of the magnetized area. In the two segments, the direction of magnetization gradually varies between an orientation perpendicular to the direction of displacement of the moving member and a direction forming an angle of less than 90° relative to the direction of displacement of the moving member. The magnets 6, 7 are carried by an armature 11, ideally made of a soft ferromagnetic material so as to close the magnetic flux.

Depending on the current running through the loaded coils 3a, 3b, the moving member thus moves relative to the stator structure 1 according to the direction defined by the axis 10, by defining an air gap E delimited by the radial distance—i.e. perpendicularly to the axis 10—separating the armature 11 and the stator assembly 1 and a mechanical clearance j delimited by the radial distance between the magnets 6, 7 and the stator structure 1. Ideally, the air gap E and the mechanical clearance j are constant over the travel Y of the actuator. Depending on the direction of the current through the coils 3a, 3b, North and South poles are created at the extensions 8, 9 which thus try to be aligned with the respective South and North poles of the magnets 6, 7.

The height of the lateral poles $Y_{L2}$ is more particularly defined as having the axial width:

$$Y_{L2}=(2Y_{L1}+2Y_B+Y_{C1}-2Y_G-Y_{C2})/2$$

Such width $Y_{L2}$ of the lateral poles is smaller than the width $Y_{C2}$ of the central pole 4, with the widths $Y_{L2}$ and $Y_{C2}$ being measured at the central periphery of the yoke facing the moving member. The width $Y_{L2}$ matches the height of the first polar zone between the front end and the first notch, as measured at the internal annular surface facing the moving member. The width $Y_{C2}$ matches the height of the intermediate polar zones, or shoe, as measured at the internal annular surface facing the moving member.

Figure 3:
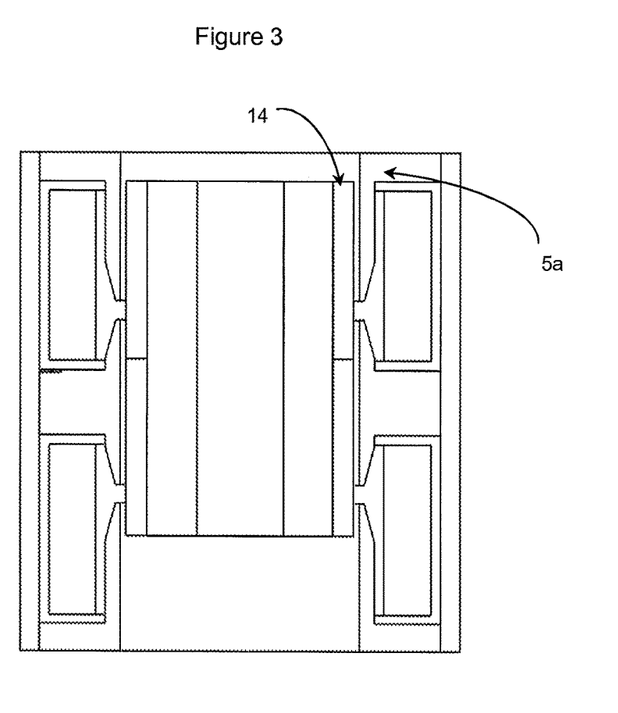
FIG. 3 shows a schematic sectional view of the actuator according to the preferred embodiment, with the moving member being in a position, over its travel, which makes it possible to view one of the dimensional rules of the invention.

Advantageously, the width $Y_A$ of the magnets 6, 7 is equal to the width $Y_B$ of the coil 3a, 3b. Both characteristics enable the desaturation of the circuit over the second part of the travel as shown in FIG. 3. FIG. 3 shows the moving member 2 close to the three-quarters of the travel. The transition 16 separating the two opposite polarities leave the area opposite the section having a width $Y_{C1}$ of the central pole, whereas the end 14 of the magnet 6 comes opposite the section having a width $Y_{L1}$ of the lateral pole 5a. This essential geometric configuration makes it possible to give the actuator this surprising characteristic having a constant force at the end of the travel, even though the current in the coils 3a, 3b is high, with the major part of the magnetic flux no longer having to pass through the extensions 8 and thus avoiding a loss in magnetic potential.

Figure 4:
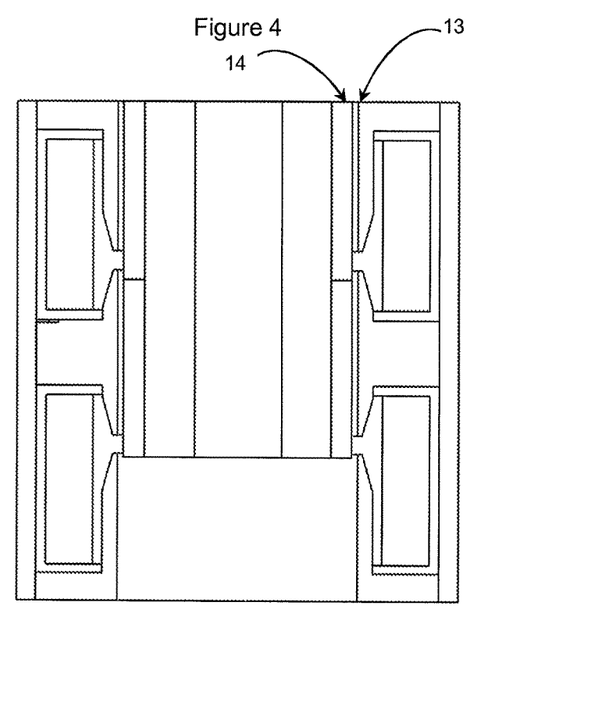
FIG. 4 shows a schematic cross-sectional view of the actuator according to the preferred embodiment, with the moving member being at the end of its travel.

The central pole $Y_{C2}$ is of the order of magnitude of the travel Y. When the moving member 2 has moved along the travel Y, the axial end 14 of the magnet 6 is axially aligned with the end of the lateral pole 13 as shown in FIG. 4.

Figure 5:
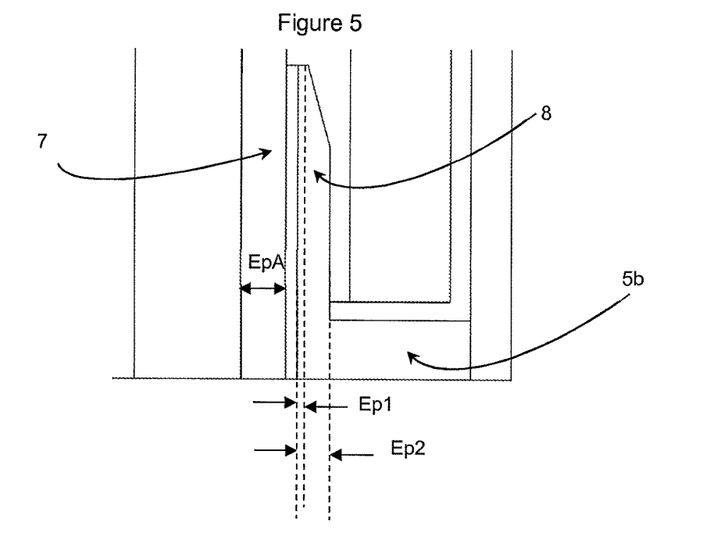
FIG. 5 shows a detailed cross-sectional view of the actuator according to the preferred embodiment.

FIG. 5 is a detailed view of a lateral pole 5b, which has a minimum thickness Ep1 at the axial end of the extension 8 and a maximum thickness Ep2 at the basis of the extension 8. Preferably, the thickness Ep1 is of the order of magnitude of the mechanical clearance j and the thickness Ep2 is of the order of magnitude of the magnet radial thickness EpA 7. The actuator according to the invention has unusually thin shoes. The poles cause a local saturation making it possible to prevent the fading of the main magnetic flux by restoring a favorite path for the passage of the magnetic flux through the air gap.

The reduction in the sections of the central 4 and lateral 5a, 5b poles shoes is provided with a view, not to simply reducing the leakage flux between the poles, but to reducing it to a quasi-null value when the actuator is supplied with the maximum electric power. With a low electric power, the useful flux is not sufficient to cause a global desaturation of the magnetic circuit at the end of the travel, thus making it possible to generate a constant force over the entirety of the travel.

When the maximum electric power is supplied to the actuator, the local saturation of the teeth results in drastically reducing the leakage flux which, to the specialists' surprise, results in the global desaturation of the magnetic circuit, more specifically at the end of the travel. As a matter of fact, this results in lowering the working point of the magnetically soft material of the magnetic circuit which finds a medium with a higher relative permeability. The useful magnetic flux circulating in this more permeable medium is thus increased.

Figure 6:
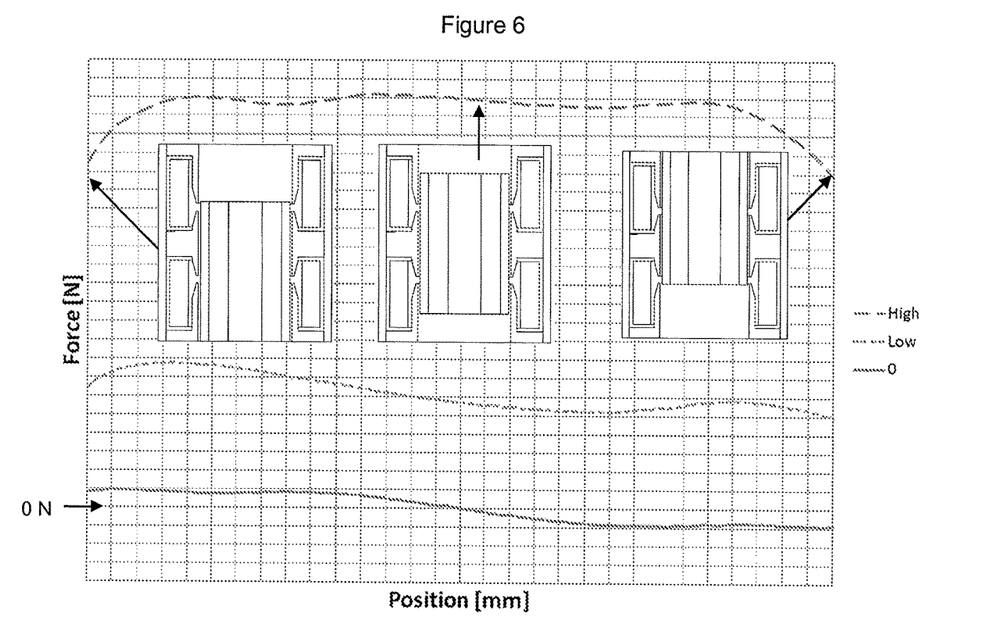
FIG. 6 shows a schematic curve of the evolution of the force vs. the position and the power.

FIG. 6 shows the curve of the force as measured versus the position. The beginning of the travel is on the left of the curve and the end of the travel is on the right of the curve. FIG. 6 is interesting in that it emphasizes that the force at the end of the travel and the force at the beginning of the travel are substantially at the same level whether the power is low or high, i.e. respectively the current is weak or intense. Power is called high when it is much higher than that the actuator can continuously bear, without being damaged by too high a temperature. The curve marked 0 is the one corresponding to the force without current. Such force is almost null over the entirety of the useful travel as defined by the whole "position [mm]" window shown. At the end of the travel, the end of the magnet is positioned opposite the full section of the upper lateral pole, which makes it possible to take advantage of the magnetic circuit desaturation effect ensuring a force linear characteristic as a function of the position and which more particularly makes it possible to obtain an identical force at the beginning of the travel and at the end of the travel.

Figure 7:
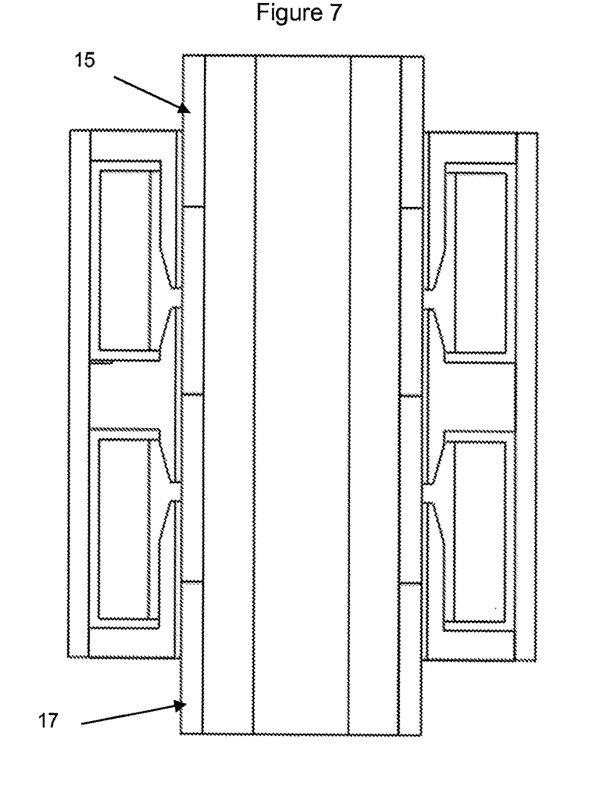
FIG. 7 shows a schematic sectional view of the actuator according to a secondary embodiment.

FIG. 7 shows an alternative embodiment using all the elements of the actuator of FIG. 1 whereto two additional magnets 15, 17 adjacent to the two magnets 6, 7 have been added. Such addition makes it possible to generate an additional force factor for a given current without modifying the previously disclosed advantages which make up the invention and enable to de-saturate the circuit, even though the overall dimension has globally increased.

Figure 8:
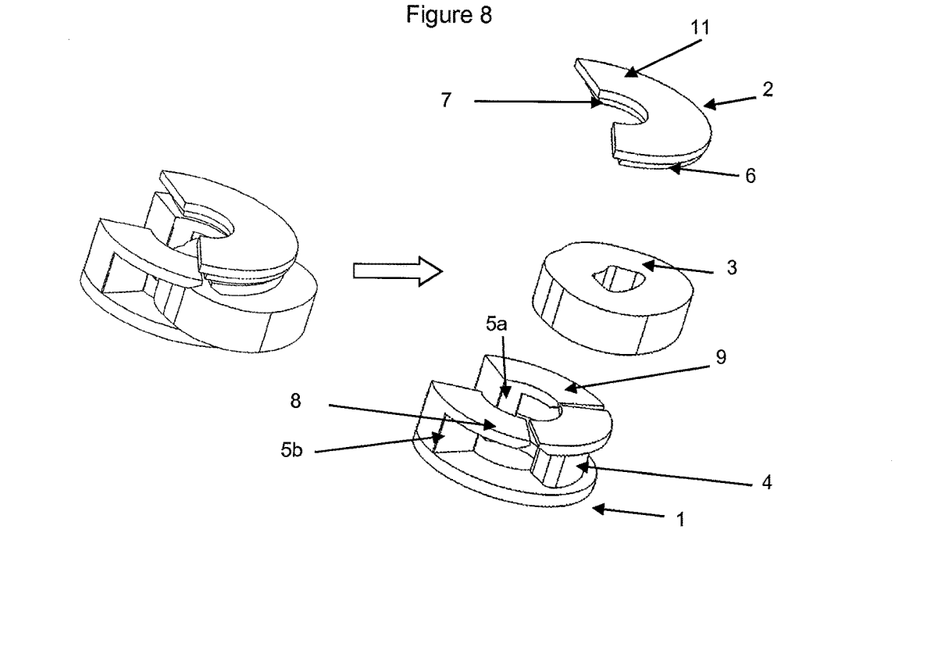
FIG. 8 shows a schematic sectional view of the actuator according to an angular embodiment.

FIG. 8 shows another alternative embodiment consisting in providing an actuator with an angular travel. In the left part, the actuator is shown in a three-quarter bottom view and in the right part, the same actuator is shown in an exploded view making it possible to see the moving member 2 carrying two thin magnets 6, 7, with the moving member 2 moving in rotation with respect to the stator structure 1 whereon a coil 3 is positioned, here around the central pole 4. The two lateral poles 5a, 5b have, like in every other embodiment of the invention, the same geometrical relationships, making it possible to keep a constant force law on the travel even with a high power.

Figure 9:
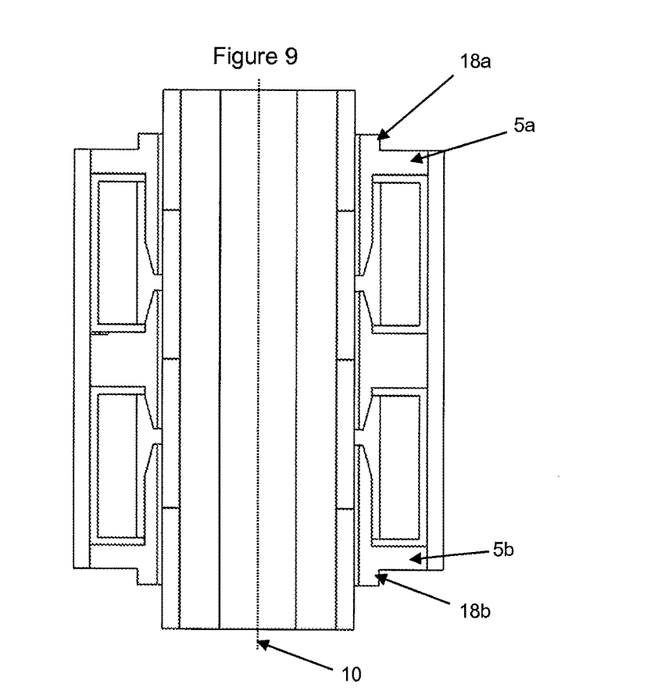
FIG. 9 shows a schematic sectional view of the actuator according to another linear embodiment.

FIG. 9 shows an alternative embodiment wherein the stator structure 1 shows, at the lateral poles 5a, 5b, protrusions 18a, 18b which extend the lateral poles 5a, 5b in a direction opposite the extensions 8. Such protrusions make it possible to take account of the positioning tolerance for the moving member 2 relative to the stator structure 1 by shifting the travel Y on one side or another side in the direction of the travel.

Figure 10:
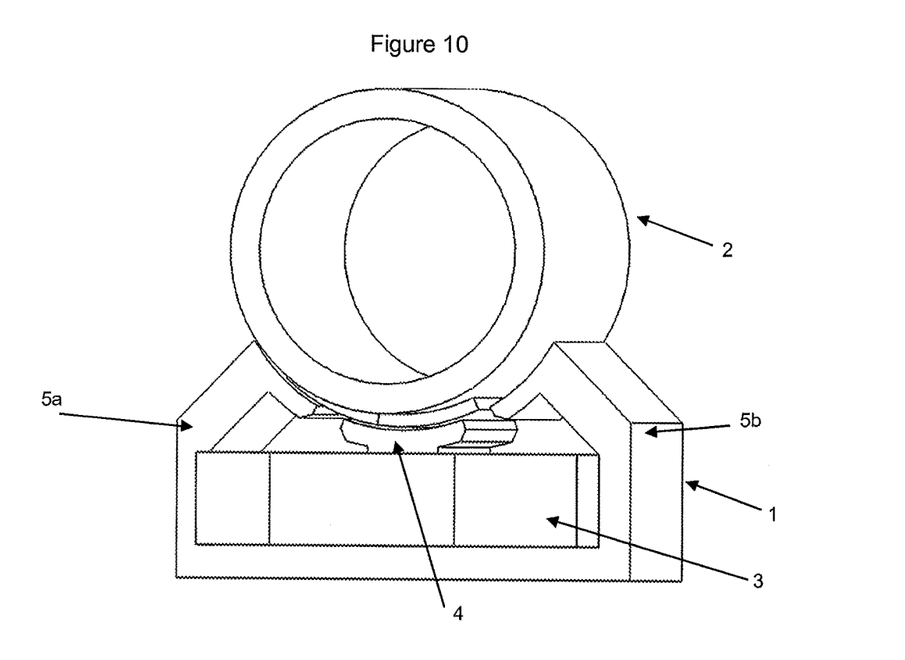
FIG. 10 shows a schematic view of an actuator according to a peripheral embodiment.

FIG. 10 shows an alternative embodiment showing an actuator having a peripheral geometry, wherein the same elements as previously described for the other embodiments can be found, more specifically the moving member 2 carrying the magnets 6, 7 and the stator structure 1 carrying the coil 3, and made of a central pole 4 and two extended lateral poles 5a, 5b. According to this geometry, the stator structure does not totally enclose the moving member 2, but runs on a part only of the tubular surface thereof, to form a "groove" which runs on approximately one third of the tubular surface of the moving member.

The invention claimed is:

1. An electromagnetic actuator operably producing a force due to current that remains substantially constant over an entirety of its useful travel Y, the actuator comprising:
   at least one stator structure;
   at least one electrical supply coil; and
   a moving member;
   the stator structure having, on the one hand, a central pole running perpendicular to a direction of the travel Y and having a width $Y_{C1}$ in the direction of the travel and terminating at its end in a width $Y_{C2}$ that is greater than or equal to the travel Y of the moving member, with $Y_{C2}$ being greater than $Y_{C1}$, and, on the other hand, two lateral poles having widths $Y_{L1}$ in the direction of the travel and terminating at their end in a width $Y_{L2}$ greater than $Y_{L1}$, with the lateral poles and the central pole being separated by a distance $Y_G$;
   the moving member that is able to move relative to the stator structure comprising an armature supporting at least two adjacent thin permanent magnets each having a width $Y_A$;
   the coil having a width $Y_B$, the width $Y_{L2}$ of the lateral poles being equal to $(2Y_{L1}+2Y_B+Y_{C1}-2Y_G-Y_{C2})/2$ and less than the width $Y_{C2}$ of the central pole;
   the thin permanent magnets being directly adjacent to each other without any gap therebetween; and
   a width of each of the coils $Y_B$ being greater than the width of bases of all of the poles $Y_{C1}+Y_{L1}+Y_{L1}$.

2. The actuator according to claim 1, wherein the distance between the moving member and the stator structure defines a mechanical clearance and the lateral poles have a variable thickness, considered as perpendicular to the direction of the travel Y and in that the thickness, defined in the thinnest part thereof, is of the order of magnitude of the mechanical clearance.

3. The actuator according to claim 2, wherein the thickness of the lateral poles, considered as perpendicular to the direction of the travel Y and defined, in the thickest part thereof, is at most equal to the thickness of the thin magnets.

4. The actuator according to claim 1, wherein the thin magnets have a magnetization the direction of which is mainly perpendicular to the direction of the travel Y.

5. The actuator according to claim 1, wherein the thin magnets have a magnetization the direction of which is perpendicular to the travel Y in the central area of the thin magnets and forms, with such direction, a non-constant angle at the ends thereof.

6. The actuator according to claim 5, wherein the armature supports four adjacent magnets.

7. The actuator according to claim 1, wherein the travel Y is a rotary stroke.

8. The actuator according to claim 1, wherein the travel is linear and the stator structure and the moving member are in a direction perpendicular to the direction of the travel Y.

9. The actuator according to claim 1, wherein the travel is linear and the moving member revolves around an axis co-linear with the direction of the travel Y.

10. The actuator according to claim 1, wherein the lateral poles have different widths $Y_{L1}$.

11. The actuator according to claim 1, wherein the lateral poles have axial protrusions oriented opposite the extensions of the lateral poles.

12. The actuator according to claim 1, wherein the armature has a substantially constant force over an entirety of its travel including at its ends of travel, even if current in the coil is high.

13. An electromagnetic actuator operably producing a force due to current that remains substantially constant over an entirety of its useful travel Y, the actuator comprising:
   at least one stator structure;
   at least one electrical supply coil; and
   a moving member;
   the stator structure having, on the one hand, a central pole running perpendicular to a direction of the travel Y and having a width $Y_{C1}$ in the direction of the travel and terminating at its end in a width $Y_{C2}$ that is greater than or equal to the travel Y of the moving member, with $Y_{C2}$ being greater than $Y_{C1}$, and, on the other hand, two lateral poles having widths $Y_{L1}$ in the direction of the travel and terminating at their end in a width $Y_{L2}$ greater than $Y_{L1}$, with the lateral poles and the central pole being separated by a distance $Y_G$;

the moving member that is able to move relative to the stator structure comprising an armature supporting at least two adjacent thin permanent magnets each having a width $Y_A$;

the coil having a width $Y_B$, the width $Y_{L2}$ of the lateral poles being equal to $(2Y_{L1}+2Y_B+Y_{C1}-2Y_G-Y_{C2})/2$ and less than the width $Y_{C2}$ of the central pole;

the thin permanent magnets being directly adjacent to each other without any gap therebetween; and the width $Y_B$ of the coil being equal to the width $Y_A$ of the magnets, in the direction of the travel Y.

14. The actuator according to claim 13, wherein the armature has a substantially constant force over an entirety of its travel including at its ends of travel, even if current in the coil is high.

15. An electromagnetic actuator operably producing a force due to current that remains substantially constant over the entirety of its useful travel direction Y, the actuator comprising (a) at least one stator;
(b) at least one electrical supply coil;
(c) a moving member;
(d) the stator comprising:
   on the one hand, a central pole running perpendicular to the direction of travel Y and having a width $Y_{C1}$ in the direction of travel and terminating at its end in a width $Y_{C2}$ that is greater than or equal to the travel Y of the moving member, with $Y_{C2}$ being greater than $Y_{C1}$, and
   on the other hand, two lateral poles having widths $Y_{L1}$ in the direction of travel and terminating at their end in a width $Y_{L2}$ greater than $Y_{L1}$, with the lateral poles and the central pole being separated by a distance $Y_G$;
(e) the moving member adapted to move relative to the stator;
(f) the moving member comprising an armature supporting at least two adjacent permanent magnets each having a width $Y_A$, the at least two permanent magnets being directly adjacent to each other, without any air or pole gap between the front surface of a consecutive pair of the permanent magnets;
(g) the moving member and the stator delimiting an air gap E;
(h) the coil having a width $Y_B$, the width $Y_{L2}$ of the lateral poles being equal to $(2Y_{L1}+2Y_B+Y_{C1}-2Y_G-Y_{C2})/2$ and less than the width $Y_{C2}$ of the central pole; and
(i) the width $Y_B$ of the coil is equal to the width $Y_A$ of the magnets in the direction of travel Y.

16. The actuator according to claim 15, wherein the thin magnets have a magnetization the direction of which is mainly perpendicular to the direction of travel Y.

17. The actuator according to claim 15, wherein the armature supports the permanent magnets which are four adjacent thin magnets.

18. The actuator according to claim 15, wherein the direction of travel Y is a rotary stroke.

19. The actuator according to claim 15, wherein the lateral poles have axial protrusions oriented opposite the extensions of the lateral poles.

20. The actuator according to claim 15, wherein the armature has a substantially constant force over an entirety of its travel including at its ends of travel, regardless of an intensity level of the current in the coil.

\* \* \* \* \*